(No Model.)   8 Sheets—Sheet 3.

J. A. STONE.
CORN HARVESTER.

No. 442,922.   Patented Dec. 16, 1890.

Fig. 3.

Witnesses:
Arthur Johnson
John R. Wettenstrom

Inventor:
John A. Stone
By Burton & Burton
his attys

Fig. 4.

(No Model.) 8 Sheets—Sheet 5.

J. A. STONE.
CORN HARVESTER.

No. 442,922. Patented Dec. 16, 1890.

Fig. 5.

Witnesses:
Arthur Johnson
Jean Elliott

Inventor:
John A. Stone
By Burton & Burton
his Attys (No Model.) 8 Sheets—Sheet 7.

J. A. STONE.
CORN HARVESTER.

No. 442,922. Patented Dec. 16, 1890.

Witnesses:
Arthur Johnson
John R. Kettenstrom

Inventor:
John A. Stone
By Burton and Burton
his attys (No Model.) 8 Sheets—Sheet 8.

J. A. STONE.
CORN HARVESTER.

No. 442,922. Patented Dec. 16, 1890.

Witnesses:
Arthur Johnson
John R. Wattenstrau

Inventor:
John A. Stone
By Burton & Burton
his attys

UNITED STATES PATENT OFFICE.

JOHN A. STONE, OF CHICAGO, ILLINOIS, ASSIGNOR TO WILLIAM DEERING & COMPANY, OF SAME PLACE.

CORN-HARVESTER.

SPECIFICATION forming part of Letters Patent No. 442,922, dated December 16, 1890.

Application filed February 25, 1888. Serial No. 265,262. (No model.)

*To all whom it may concern:*

Be it known that I, JOHN A. STONE, a citizen of the United States, residing at Chicago, in the county of Cook and State of Illinois, have invented certain new and useful Improvements in Corn-Harvesters, which are fully set forth in the following specification, reference being had to the accompanying drawings, forming part thereof.

My machine comprises a frame rigid throughout, supported on a drive-wheel at the stubble end and a grain-wheel at the grain end. Upon this frame-work are supported gathering, cutting, prostrating, elevating, and husking mechanism.

A is the drive-wheel.

B is a grain-wheel.

The main frame comprises the front sill C, the rear sill C', cross-bars $C^2$, $C^3$, $C^4$, and $C^5$, extending fore and aft, connecting the front and rear sills, the grainward divider-frame, comprising the lower bar $C^6$, which is secured to the front and rear sills, uprights $C^{60}$ $C^{61}$ $C^{62}$, secured to the bar $C^6$, the top board $C^{63}$, connected to the uprights by suitable brackets $c^{63}$, the grainward divider comprising the bar $C^{64}$, secured to the bar $C^6$ and also to the front sill and extending in an upward slanting direction forward, and the board $C^{65}$, secured at the forward end of said bar above the same and extending in a slanting direction upward and rearward.

The main frame further comprises the uprights $C^7$ and $C^8$, secured to the cross-bar $C^4$, and slanting posts $C^9$ and $C^{10}$, secured to the cross-bar $C^5$, and the further slanting bars $C^{11}$ and $C^{12}$, which are secured respectively to the rear and front sills near the grain end.

To the upper ends of the posts $C^7$ and $C^8$ is secured the fore-and-aft bar $C^{13}$, to which the upper ends of the slanting bars $C^{11}$ and $C^{12}$ are secured, and to the upper ends of the posts $C^9$ and $C^{10}$ is secured a similar bar $C^{14}$. These bars $C^{13}$ and $C^{14}$ are themselves connected both at their forward and rear ends by castings $C^{15}$, which have suitable flanges by which they are bolted to said bars and contain journal-bearings for the husking-rolls, one of said bearings in each of the castings being a yielding box $C^{150}$, which has play toward and from the other bearing restrained by the spring $C^{151}$, which tends to force it toward the other bearing for the familiar purpose of allowing the husking-rolls to be separated by the passage of the stalks through them. The amount of play obtained by the box $C^{150}$ and needed for the purpose stated is not sufficient to disengage the gears which connect the two rolls nor to slacken the chains which are driven by the upper roll enough to prevent their proper action.

The elevator-bars D D' are secured at their upper ends to the bar $C^{14}$. At its lower end the forward bar D' is supported by the bar $C^{16}$, which is secured to the horizontal bar $C^{20}$.

To the posts $C^7$ and $C^9$ at the rear and to the posts $C^8$ and $C^{10}$ at the front are secured the horizontal bars $C^{19}$ and $C^{20}$, respectively. These bars extend grainward from the slanting posts $C^9$ and $C^{10}$, and afford support for the seat-plank $C^{21}$. The bar $C^{20}$ extends grainward beyond the seat-plank and gives support to other mechanisms hereinafter described.

To the bar $C^{14}$, at its rear end, there is secured the rear bar D of the elevator-frame. Said bar is further sustained by being secured to the short slanting bar $C^{17}$ at its lower end, said bar $C^{17}$ being secured to the rear sill C' and to the slanting bar $C^{11}$, and extending upward far enough to be fastened to the lower end of the bar D. The forward bar D' of the elevator-frame is secured at its upper end to the bar $C^{14}$, and is further supported by means of the bar $C^{16}$, which is fastened at its upper end to the horizontal bar $C^{20}$, and at its lower end affords securement for said bar D'.

The castings $C^{15}$ have, besides the flanges by which they are secured to the bars $C^{13}$ $C^{14}$, the flanges $c^{15}$, which give support to the plank $C^{18}$, upon which are supported certain mechanisms hereinafter described.

$C^{22}$ is a short bar secured upon the seat-plank, being blocked up at one end a short distance and at the other end secured to the cross-bar $C^{14}$. Its purpose is to afford support for the tilting lever and its locking mechanism.

The inside divider comprises the bar E, which is similar to the bar $C^{64}$ of the outside divider, and the board $E^{10}$, which is similar to the board $C^{65}$ of the outside divider. Said bars are secured together at their forward ends, and the bar E is fastened to the sill C, and, by means of the brace $E^4$, is also connected to the bar $C^{20}$.

Figure 1:
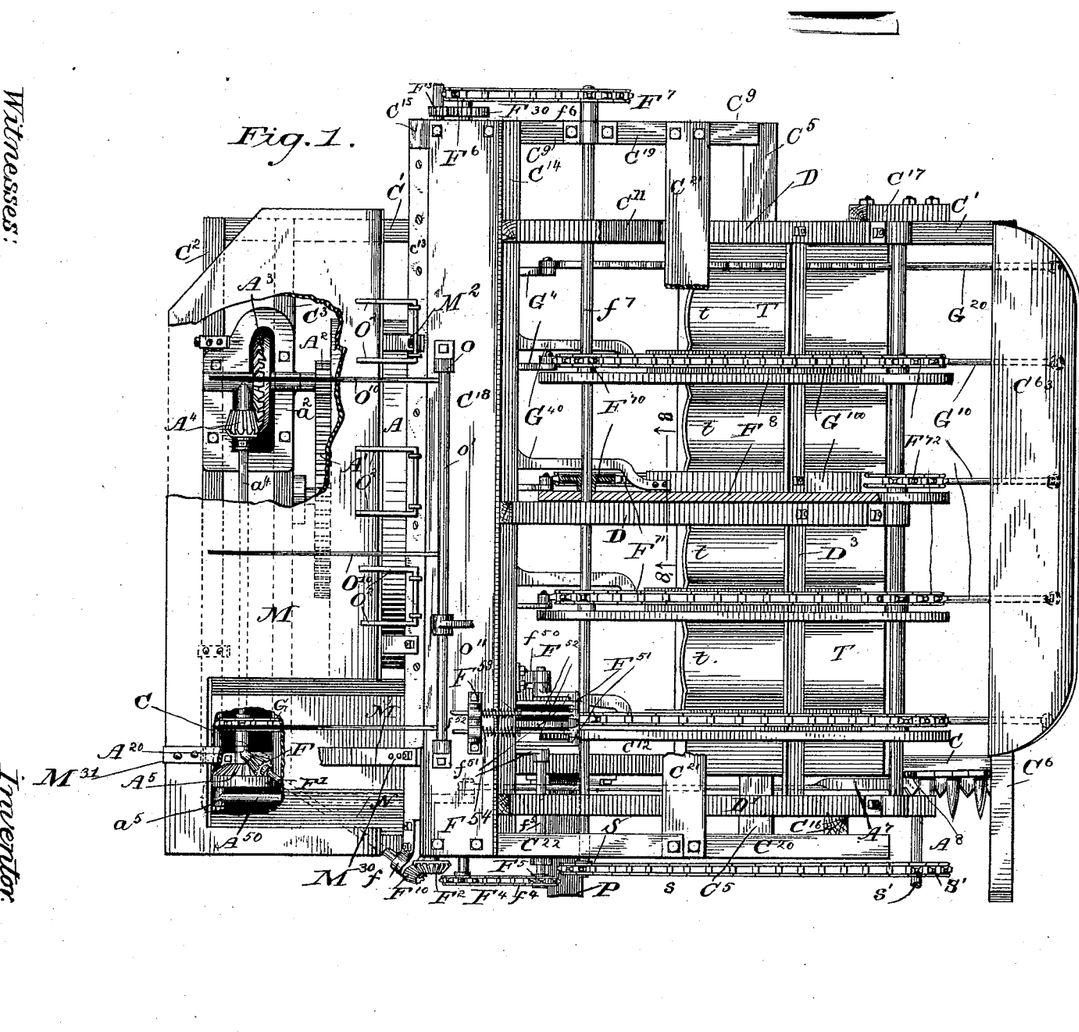
Figure 1 is a plan omitting the gathering and prostrating devices.
Figure 2:
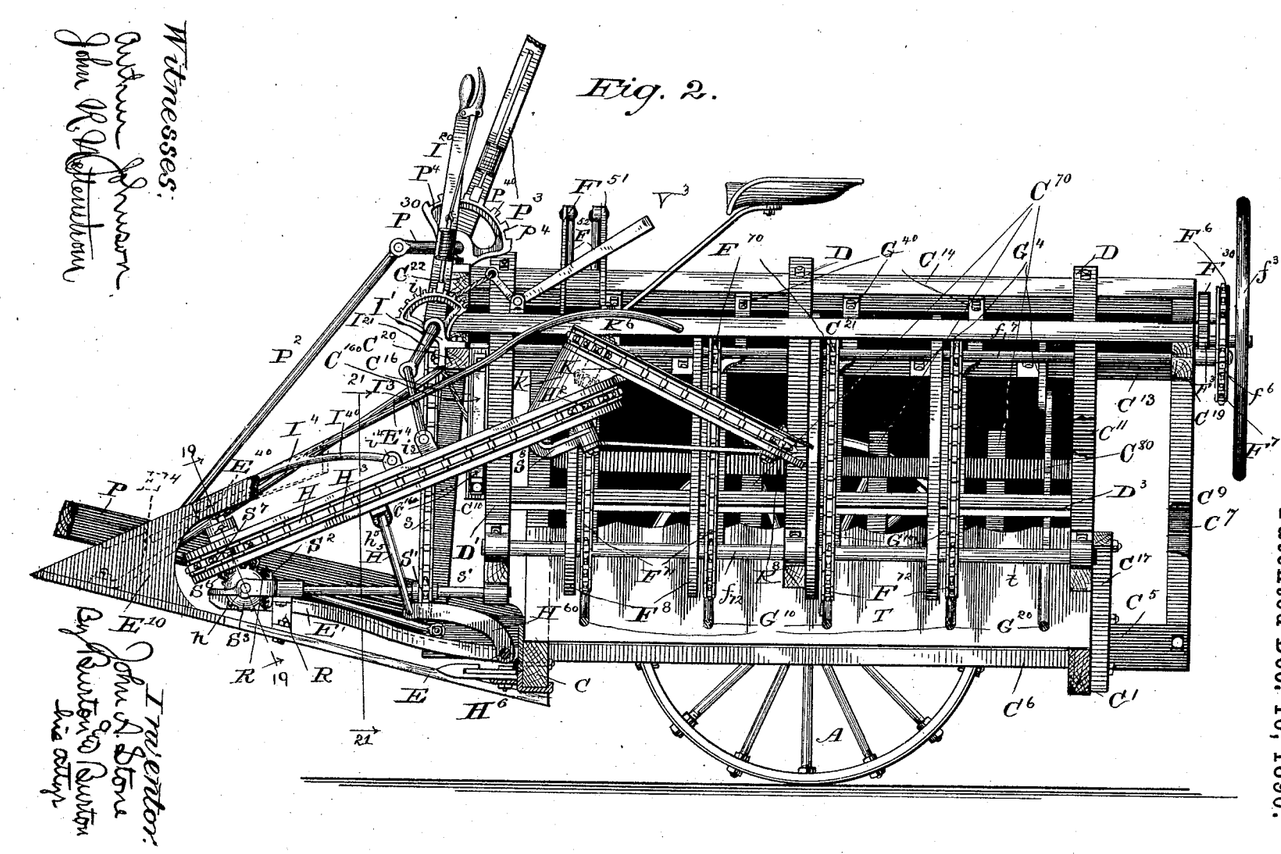
Fig. 2 is a section at the line $x\,x$ on Fig. 3, looking stubbleward.

Upon the bar E there is secured the bracket R, which is braced by the brace E', connected to its upper end and extending thence rearward and stubbleward to the sill C. The bracket R contains the bearings for the gathering driving gear-wheels, which will be hereinafter described. It is further made secure by the bar $E^2$, which is bolted at its forward end to the brace E', near the connection of the latter to the bracket R, and extends thence obliquely rearward and stubbleward to the bar $C^5$, to which it is bolted. A further brace $E^3$ is provided, which is secured to the bar $E^2$ near its forward end, and extends thence upward and rearward to the bar $C^{20}$, to which it is made fast. These connections, which primarily brace the bracket R, also very effectually brace the entire inside divider, to which that bracket is secured. Any desired number of additional bars and braces may be employed to stiffen and strengthen the frame wherever they will not interfere with the mechanism. Some such additional bars are shown in some of the figures, as in Figs. 2, 3, and 4, the horizontal transverse bars $C^{80}$ extending between the posts $C^7$ and $C^8$ at the grain side of the drive-wheel, and the upright posts $C^{70}$, which appear in Fig. 2, crossing the bars $C^{80}$.

All the parts hereinbefore described being rigidly united constitute the main frame, which includes, therefore, as subordinate parts, inside and outside dividers.

Other details of the frame will be described as it becomes needful to state their use in connection with the mechanism, which is as follows:

The master-wheel A' on the drive-wheel communicates power to the mechanism in a manner familiar in harvesting-machines, to wit: Through the pinion $A^2$, whose shaft is journaled in the bracket $a^2$, which is secured to the cross-bars $C^2$ and $C^3$, said shaft having rigid with it the bevel gear-wheel $A^3$, which meshes with and drives the pinion $A^4$, which is clutched to the shaft $a^4$, which has a bearing in the bracket $a^2$, and is further journaled in a box fixed on the front sill C.

At the forward end of the shaft $a^4$ there is secured the bevel gear-wheel $A^5$, having on its forward face a wrist-pin $a^5$, whereby the sickle is reciprocated by means of the pitman-rod $A^{50}$. Said sickle has a guide-bearing in the bracket $P^7$, which is fastened to the front sill C, and has the arm $P^{70}$, constituting a rigid connection between said bracket and the bracket P', which is also secured upon the sill and has the tongue pivoted on it. These two brackets $P^7$ and P', having their attachments to the sill some distance apart, mutually brace each other.

$A^8$ is the finger-bar, which is secured to the front sill C. It is quite short relatively to said sill, requiring space only for a few fingers, inasmuch as the sickle needs only two or three cutting knives or teeth.

$A^7$ is the sickle, of usual construction and action.

The box $A^{20}$, which affords a front bearing for the shaft $a^4$, has a bearing also for the shaft F', upon which is the bevel gear-wheel F, which meshes with the bevel-wheel $A^5$, and thus communicates power to said shaft F'.

Said shaft extends from its bearing in the box $A^{20}$ obliquely upward, forward, and grainward to a journal-box $f$, secured to the forward casting $C^{15}$. Above the said journal-bearing the shaft $F'$ carries the bevel-pinion $F^{10}$, which meshes with and drives the pinion $F^2$, which is fixed on the forward end of the shaft of the lower husking-roll. Said husking-roll carries at its rear end a fly-wheel $f^3$ and the small gear $F^3$, which meshes with and drives the gear $F^{30}$, which is fast on the shaft of the upper husking-roll and communicates power thereto to drive the same. At the forward end of the shaft of said husking-roll there is fixed a sprocket-wheel $F^4$, around which the chain $f^4$ passes and communicates power to the wheel $F^5$, which is fixed on the forward end of the packer-shaft $f^5$. Said packer-shaft obtains its forward bearing in a journal-box which is fixed on the slant post $C^{10}$ and its rear bearing in a bracket $f^{50}$, which is secured to the cross-bar $C^{14}$.

Upon the shaft $a^4$, behind its forward bearing, there is fixed the sprocket-wheel G, which drives the chain $g$, which passes around the sprocket-wheel $G'$, which is journaled on the stud $g'$, which is fixed on the slant post $c^{10}$. Rigid with this sprocket-wheel there is a cutter $G^2$, having blades $G^3$, and to the slant post there is secured the fixed blade $G^{30}$, past which the blades $G^3$ are revolved by the wheel $G'$, said fixed and revolving blades constituting a shear, for purposes hereinafter specified.

Upon the rear end of the shaft of the upper husking-roll there is secured the sprocket-wheel $F^6$, which drives the small chain $f^6$, which communicates power to the sprocket-wheel $F^7$, which is fixed on the shaft $f^7$, said shaft being journaled at the forward end in a suitable bearing provided on the horizontal bar $C^{20}$ and at the rear end in the bar $C^{19}$. Said shaft also passes through the elevator-bars D D'.

Upon the shaft $f^7$ are secured chain-wheels $F^{70}$, which drive the conveying-chains $F^{71}$, which have the conveying-teeth $f^{71}$. Said chains pass around sprocket-wheels $F^{72}$ on the shaft $f^{72}$, which is journaled in suitable bearings secured to the lower ends of the bars D D'.

To the bar $C^{13}$ there are secured several brackets $G^4$, which extend thence grainward in arms which are upwardly concave and terminate behind and under the row of chain-wheels $F^{70}$, and have there connected with them, respectively, the bars $G^{10}$, (except the rear bracket, which has instead of the bar $G^{10}$ a modification $G^{20}$.) These bars $G^{10}$ and $G^{20}$ constitute stalk-supports, which extend down along approximately parallel to the lower course of the chains $F^{71}$ and pass around the lower chain-wheels $F^{72}$, approximately concentric therewith, and thence slope upward and grainward, and are secured to the upper portion of the outside divider-frame, forming a depression or cradle underneath the grain end of the elevating-chains $F^{71}$, said depression constituting a stalk-receptacle in the rear of the sickle.

The modification referred to in respect to bar $G^{20}$ is that whereas the bars $G^{10}$ are smooth the bar $G^{20}$ is serrated, for purposes which are hereinafter explained. To the forward bracket $G^4$ there is secured the toothed serrated plate $g^{10}$, having its teeth projecting upward over the concave portion of the bracket. The upwardly-concave brackets $G^4$ constitute, by reason of their concavity, a shallow receptacle or pocket at the upper or discharge end of the elevator. Overhanging this receptacle are the brackets $G^{40}$, which are secured to the bar $C^{14}$ and extend past the sprocket-wheels $F^{70}$, and after passing them are bent sideward so that their ends overhang the lower ply of the chain $F^{71}$, and to them at those ends are secured the bars $G^{100}$, which extend down along above the lower ply of the chains, respectively, affording tracks for them to run against. These bars $G^{100}$ are further secured to the cross-bar $D^3$, which is made fast at its front and rear ends, respectively, to the front and rear bars D and D' of the elevator-frame. Said bar $D^3$ penetrates and thereby affords securement for the boards $F^8$, which are located close alongside of the chains $F^{71}$ and have their periphery parallel with the course of the chains throughout, but extending beyond the chains, so that their lower edges form guides for the stalks and keep them away from the chains, and form the upper boundary of the "throat" of the elevator, the lower boundary being formed by the bars $G^{10}$ and $G^{20}$. The packer-shaft $f^5$, journaled as described, has two cranks $f^{51}$, upon whose wrists are journaled, as in the familiar construction, the packers $F^{51}$, having their operating ends downward and in vertical planes, one on each side of the forward bracket $G^4$ and forward elevating-chain $F^{71}$. The upper ends of said packers are controlled by the links $F^{52}$, which play longitudinally through the boxes $F^{53}$, which are pivoted to a small bracket $f^{52}$, secured upon the board $C^{18}$, a spring $F^{54}$ being coiled about each link and stopped thereon and on the box $F^{53}$, to give the packers a yielding action, for purposes hereinafter explained.

Upon the forward end of the shaft $f^7$ there is secured the sprocket-wheel S, which drives the chain $s$, passing around it and around the sprocket-wheel $S'$, which is made fast upon the shaft $s'$, which is journaled at its rear end in a suitable bearing provided on the under side of the bar D' of the elevator-frame. Said shaft $s'$ is journaled at the forward end in the bracket R, and in front of said bearing it carries the beveled gear-wheel $S^2$, which meshes with and drives the beveled gear-wheel $S^3$, which is journaled in the same bracket.

Upon the shaft $h$ of the gear-wheel $S^3$ there is pivoted the eye $S^4$, which has the shank $S^5$, constituting an axle-bolt upon which is journaled the wheel $S^6$ $S^7$, comprising the beveled gear $S^6$ and the sprocket-wheel $S^7$, the said gear-wheel meshing with and being driven by the gear-wheel $S^3$. The axle-bolt $S^5$ is also made fast to the gatherer-frame $H^3$, between whose two bars the sprocket-wheel $S^7$ is located. The gatherer-frame $H^3$ extends in an inclined direction upward and rearward, and at a point somewhat rearward from the vertical plane of the sill C the sprocket-wheel $H^2$ is journaled, a suitable bracket $S^8$ being secured to the frame $H^3$ for that purpose, and the gatherer-chain H, having the usual construction, is carried around said wheels $S^7$ and $H^2$.

From this construction it will be apparent that the gatherer-frame $H^3$ is pivoted upon the shaft $h$ of the beveled gear-wheel $S^3$, and it is adapted to be raised and lowered at the rear end by the following mechanism: Upon the bar $C^{20}$ there are secured two brackets I and I', in which there is journaled the rock-shaft $I^2$. The bracket I is provided with a notched segment $i$, and the shaft $I^2$ is provided with the lever-arm $I^{20}$, which oscillates past said segment and has upon it a familiar form of locking-dog to engage the notches of the segment $i$. The other end of the shaft $I^2$ is formed into a crank $I^{21}$, grainward from the bracket I', and at the end of the said crank, which extends forward and downward, there is connected the forward link $I^3$, which at the lower end is pivoted to the gatherer-frame $H^3$, a small bracket $i^3$ being provided for that purpose secured upon said frame. To the gatherer-frame, also at a short distance in front of the bracket $i^3$, is the bracket $i^4$, on which is pivoted the arm $I^{40}$ of the stubbleward stalk-check $I^4$. Said stalk-check passes loosely through the sleeve $E^{40}$, which is secured to the board $E^{10}$ of the stubbleward divider and being divided in the rear of the said sleeve, the arm $I^{40}$ extending as described and the principal arm extending upward and rearward, first obliquely grainward and then directly rearward for a considerable distance and terminating above the prostrator well toward the rear of the machine. To the under side of the gatherer-frame there is secured a small bracket $h^5$, in which is pivoted the link $H^5$. In suitable bearings secured to the front sill C, immediately behind the vertical plane of the cut of the sickle, there is journaled a rock-shaft $H^6$, which extends behind the sickle and has at the ends crank-arms $H^{60}$ and $H^{61}$, respectively, extending upward and forward, said crank-arms being therefore at opposite ends of the row of fingers of the finger-bar. To the crank-arm $H^{60}$, at the stubble end of the rock-shaft $H^6$ the link $H^5$ is connected, and to the crank-arm $H^{61}$ at the other end there is connected the link $H^7$, the other end of which is pivoted to the board J. Said board is pivoted at its forward end to the outside divider, a suitable bracket $j$ being provided for that purpose, and secured to its stubble-edge and leaning grainward is the cheek $P^5$, which is a foot or more in width at the middle and thence to the rear, tapering to a point at the forward end. The parts J and $P^5$ together constitute a stalk-guide to guide and hold the stalks toward and within the grasp of the gatherer-chain H. The board J supports the bracket $j'$, which is flexibly connected to said board by means of the stem $j^{11}$, which is guided in the eye $j^{12}$ of a little bracket make fast to the board, a spring $j^{10}$ being interposed above the eye encircling the stem and reacting at the upper end against the bracket $j'$, a stop-nut $j^{13}$ being placed on the lower end of the stem, and to said bracket $j'$ is pivoted the arm $J^{10}$ of the outside stalk-check J'. This stalk-check is precisely similar (with one exception) to the check $I^4$, and is loosely connected to the outside divider by being inserted through the sleeve $e^4$, which is secured to the board $C^{65}$, and is precisely similar to the sleeve $E^{40}$, which is secured to the board $E^{10}$ of the inside divider. The difference between the guides J' and $I^4$ is found at their rear ends, the former being curved gradually grainward at the rear end and the latter being turned abruptly stubbleward and then curved again rearward. An arm $H^{30}$, set off from the gatherer-frame $H^3$ and extending parallel with the latter, plays in the guide $C^{160}$, fixed on the grainward side of the post $C^{16}$, and tends to prevent sideward swaying of the gatherer-frame.

The tilting of this machine is effected in a familiar manner, the tongue P being pivoted to a bracket P', which is secured to the front sill, a link $P^2$ being connected to the pole some distance forward from its pivot and extended thence to the arm $P^{30}$ of the lever $P^3$, which is pivoted on the bracket $P^4$, which is secured on the bar $C^{22}$, said bracket $P^4$ being formed with a notched segment $P^{40}$, alongside of which the lever-arm $P^3$ oscillates and to which it is locked by the dog $P^{41}$, operated in the usual manner.

Upon the rear end of the gatherer-frame $H^3$ there is secured the prostrating-mechanism frame. This mechanism consists of an endless chain, suitably toothed, traveling around sprocket-wheels in a course sloping obliquely downward to the rear, its forward end overhanging the rear end of the gatherer-chain and the course of said prostrating-chain, extending thence back about half the width of the machine from front to rear, so that the rear end overhangs the third elevating-chain. The frame of the prostrating mechanism consists of the boards K and the drum K', suitably blocked apart, said drum being secured to the lower of said boards at its forward end, and fitted at its lower end onto the upper surface of the gatherer-frame $H^3$. A suitable bracket $K^2$, secured upon the prostrator-frame, has bearings for a short shaft $K^3$, which carries the beveled pinion $K^4$. Said pinion meshes with and is driven by a beveled pinion $K^5$, which is integral with the rear sprocket-wheel $H^2$ of the gatherer, whereby motion is communicated from said gatherer to the sprocket-wheel $K^6$, which is fixed on the shaft of the pinion $K^4$, and which is the drive-wheel of the prostrating-chain $K^7$. At the rear end (which is the lower end) of the prostrating-mechanism frame there is journaled a suitable wheel $K^8$, around which the chain $K^7$ travels. The prostrator-frame is further made securely rigid with the gatherer-frame by means of the brace $K^9$, which is connected to the end of the axle $K^5$ of the wheel $H^2 K^5$, and thence extends to the axle of the wheel $K^8$, to the lower end of which it is secured. The frame of the prostrating mechanism being thus rigid with that of the gatherer mechanism, the former mechanism rises and falls with the latter as it is adjusted at its rear end. Such adjustment is affected by rocking the shaft $I^2$ by means of its lever-arm $I^{20}$, which causes the crank-arm $I^{21}$, through the link $I^3$, to raise or lower the gatherer and with it the inside spring stalk-check $I^4$, and by means of the link $H^5$, rock-shaft $H^6$, and the lever-arms $H^{60}$ and $H^{61}$, and the link $H^7$, to raise or lower also the cheek $P^5$ and grainward spring stalk-check $J'$.

Figure 3:
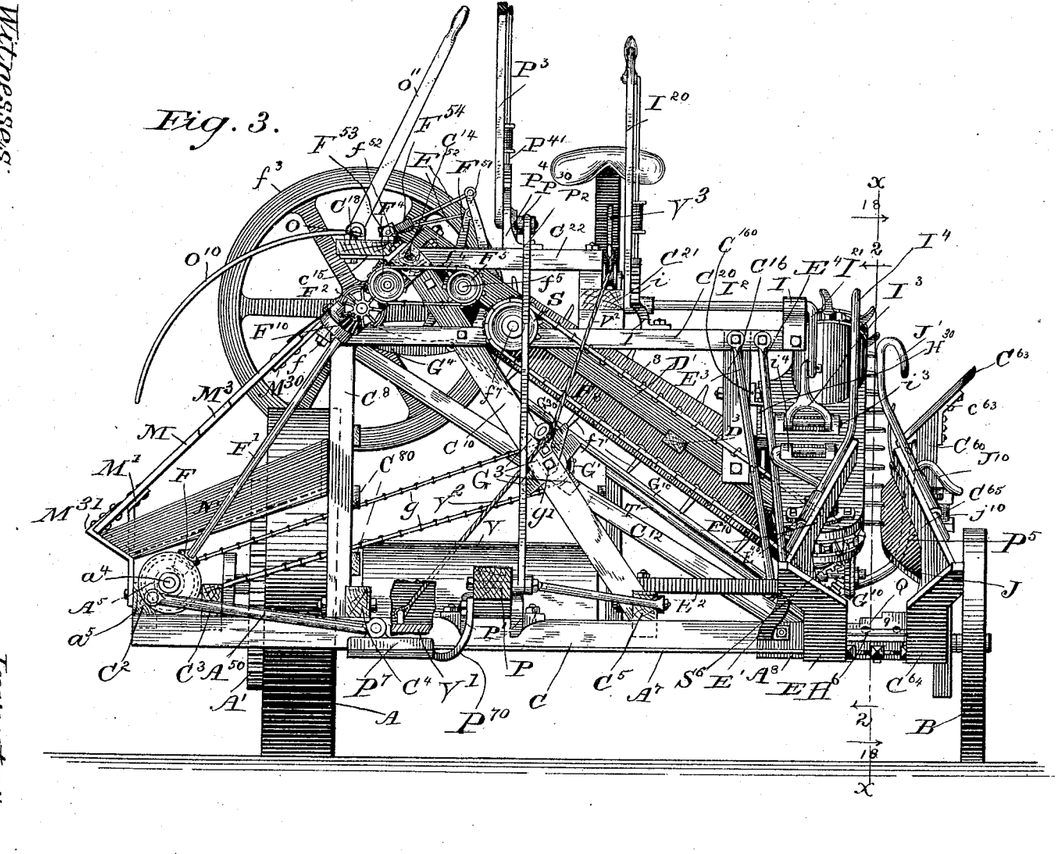
Fig. 3 is a front elevation.
Figure 4:
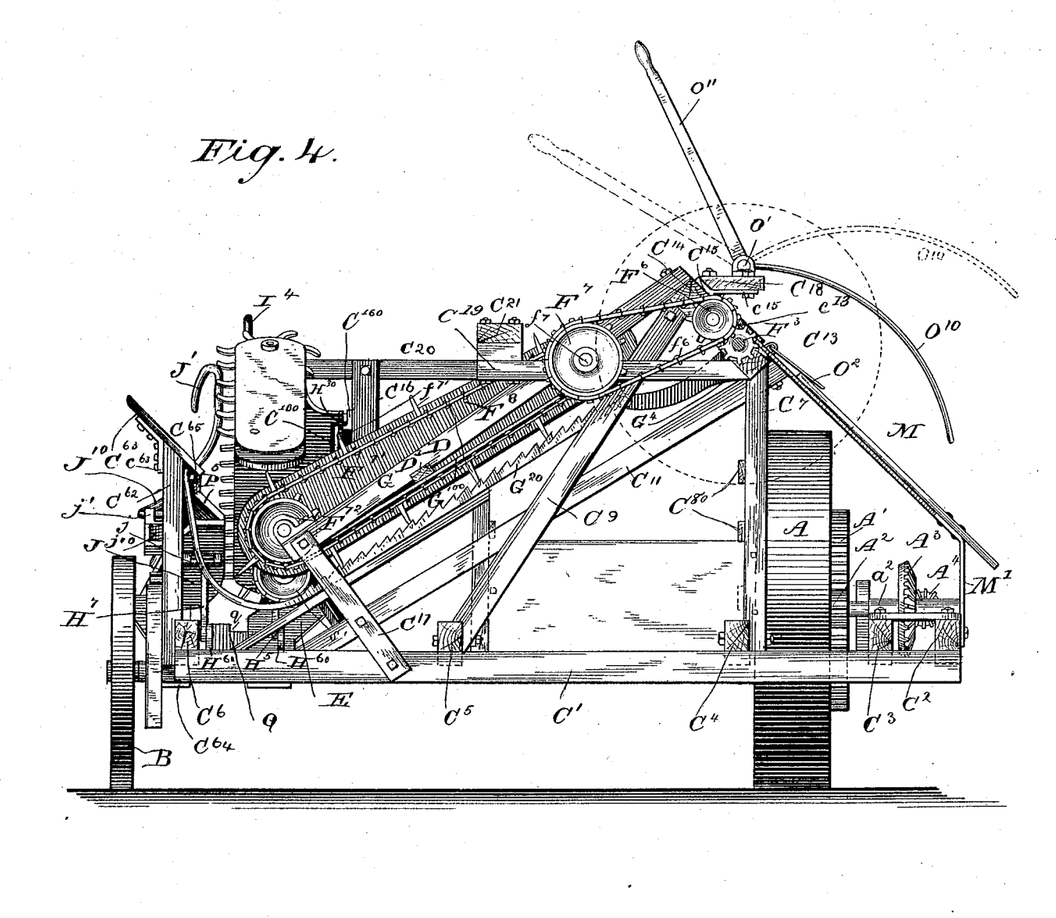
Fig. 4 is a rear elevation.
Figure 5:
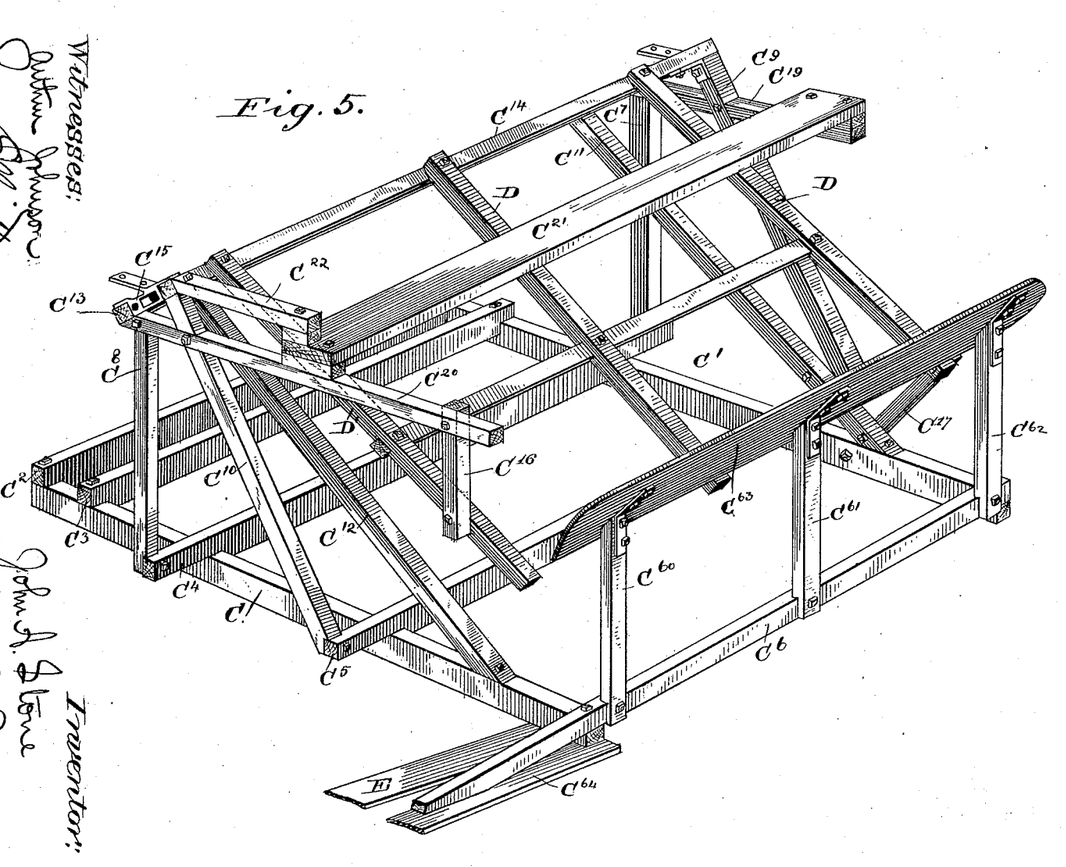
Fig. 5 is a perspective of the supporting-frame, all operating mechanism being removed, the view being from the forward grainward corner, looking stubbleward and rearward.
Figure 6:
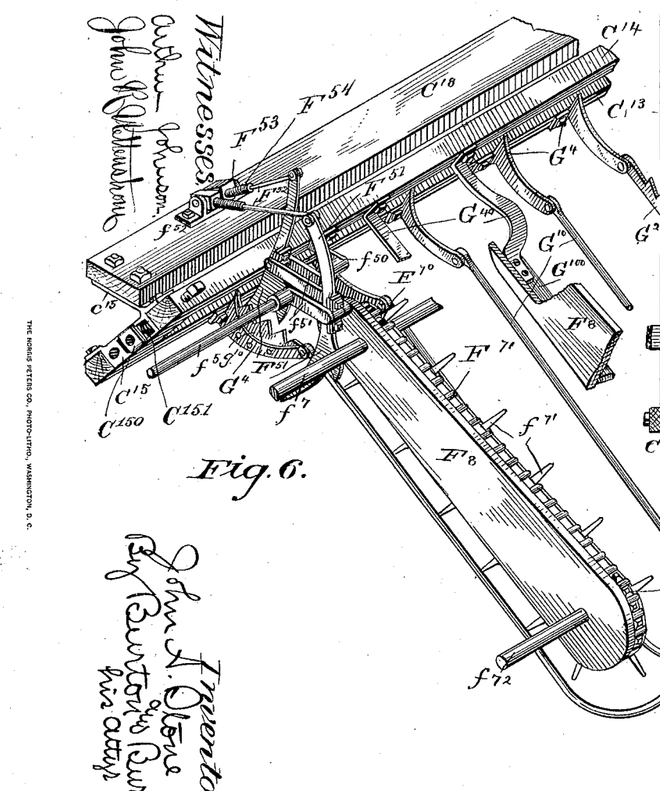
Fig. 6 is a detail perspective of a part of the elevating mechanism as seen from the grainward forward corner, looking stubbleward and rearward.
Figure 7:
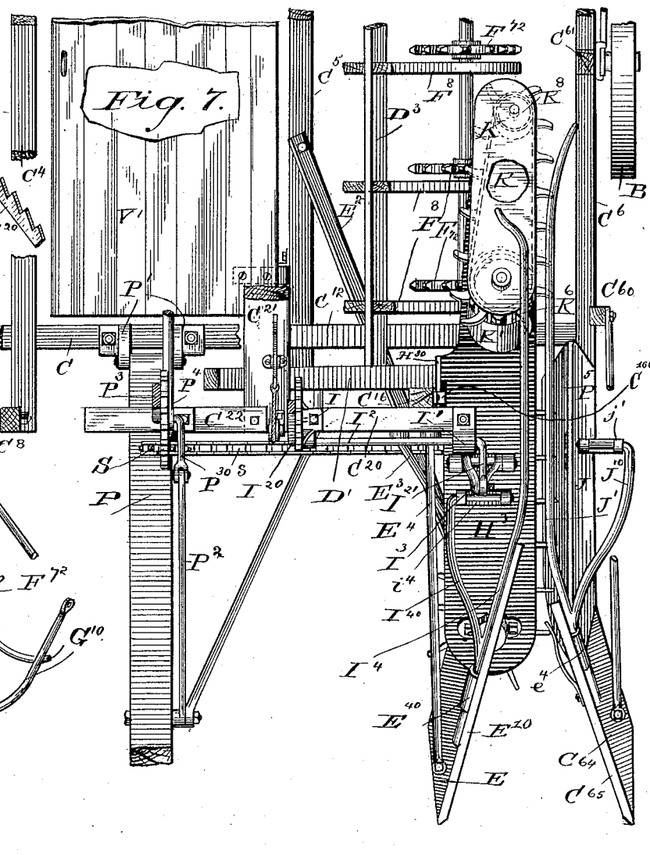
Fig. 7 is a detail plan of a portion of the harvester at the forward and grainward quarter of the machine, including the whole of the gathering and prostrating mechanisms, and showing their positions relatively to the adjacent parts of the machine.
Figures 8, 9, 10, 11, 12:
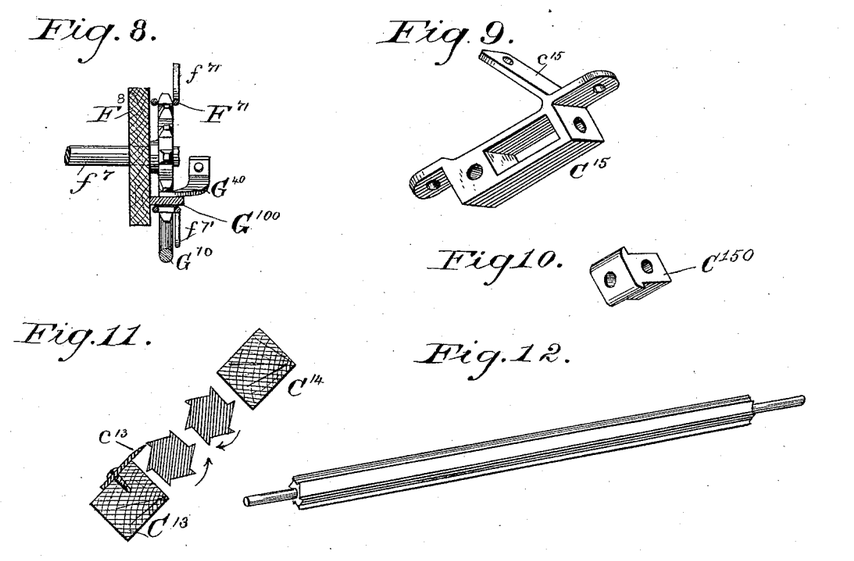
Fig. 8 is a section through the line 8 8 on Fig. 1.
Fig. 9 is a perspective of a bracket in which the bearings of the husking-rollers are obtained.
Fig. 10 is a perspective of a yielding journal-box for one of the husking-rollers.
Fig. 11 is a section through the husking-rollers and the adjacent bars of the machine transversely to the axes of said rollers.
Fig. 12 is a perspective of one of the husking-rollers.
Figure 13:
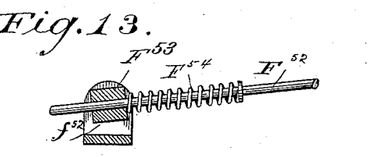
Fig. 13 is a detail elevation of a yielding packer-guiding link and its guide-bearing.
Figure 14:
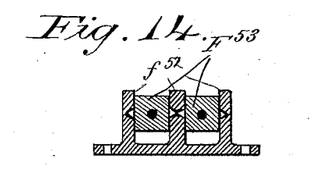
Fig. 14 is a section through the bracket in which such guide-bearings for the two packer-guiding links are pivoted, showing said pivoted bearings therein.
Figure 15:
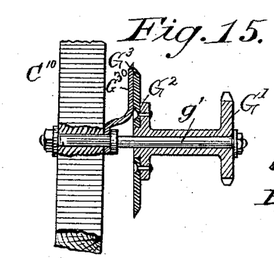
Fig. 15 is a section through a device for cutting off the butts, showing the support on the frame for its fixed member and the actuating wheel and shaft of its moving member.
Figure 16:
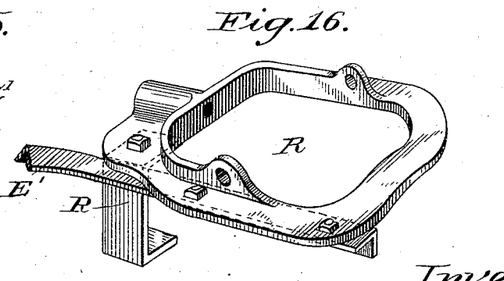
Fig. 16 is a perspective of a frame or bracket which affords bearings for certain devices connected with the gathering mechanism.
Figure 17:
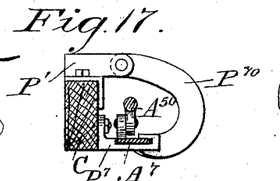
Fig. 17 is a side elevation of the bracket which has the guide-bearing for the sickle, the front sill and sickle-driving pitman being shown in section.
Figure 18:
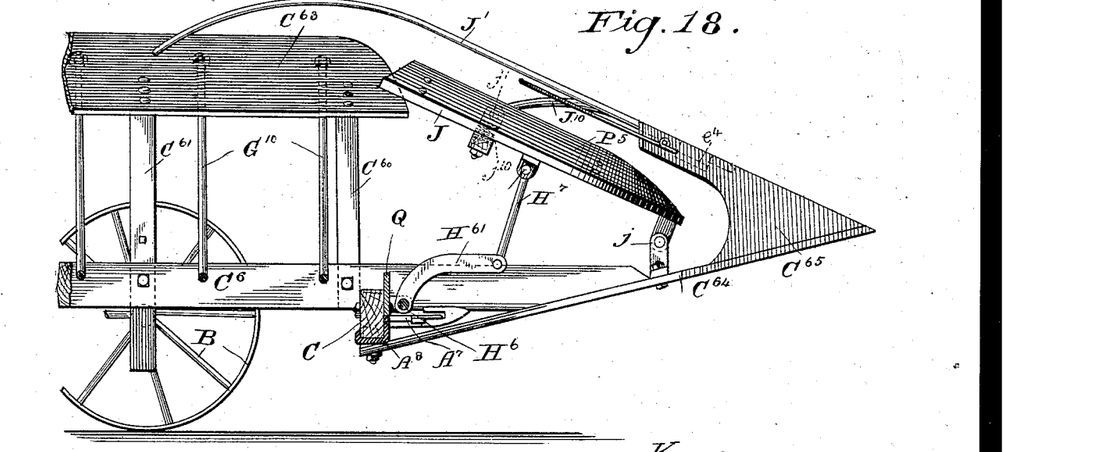
Fig. 18 is a section at the line $x\,x$ on Fig. 3, looking grainward.
Figure 19:
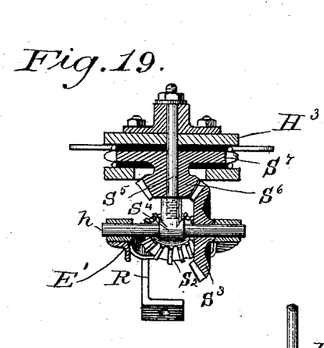
Fig. 19 is a section through a bracket at the line 19 19 on Fig. 2.
Figure 20:
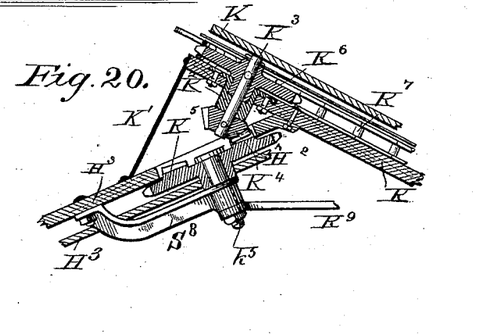
Fig. 20 is a section fore and aft in a vertical plane through proximate portions of the gatherer and prostrator, said section being made in the plane of the axes of the shafts through which the power is communicated from one to the other.
Figure 21:
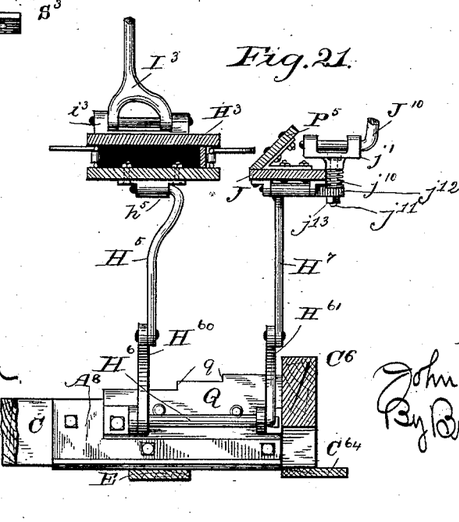
Fig. 21 is a section at the line 21 21 on Fig. 2, showing also the parts which would be cut by such a plane on Fig. 18.

The operation of this assemblage of mechanisms is as follows: As the machine advances, a row of stalks is received between the forwardly-divergent dividers, and the stalks are thereby gathered toward the center within the reach of the teeth of the chain H, by which they are fed toward the rear, being forced between the spring stalk-check $I^4$ and $J'$, and if the speed of the gatherer is a little greater than the travel of the machine the stalks will usually be leaning rearward somewhat when they encounter the sickle and are severed. At that instant the upper portion will be about to engage or already engaged by the teeth of the prostrating-chain $K^7$, and said chain will carry the said upper ends of the stalks back and downward, laying them, therefore, prostrate behind the sickle in the receptacle or cradle which is formed by the depression in the bars $G^{10}$. Before, however, they are entirely prostrated the forward ends of the butts will have been seized by the forward elevating-chains $F^{71}$, and said chains will have commenced carrying said butts around beneath them and thence around upward, so that by the time the tops are fairly prostrated upon the bars $G^{10}$ the butts will have advanced some distance up the elevator in a position with the heads lower than the butts, the stalks lying aslant across the bars under the elevating-chains. If the butts of any stalks should project forward far enough to encounter the blade $G^{30}$, they will be severed between the said blade and the blades $G^3$ of the revolving cutter $G^2$ and thus reduced to such length that they will not protrude forward farther than the forward end of the husking-rolls. When the stalks being thus carried by the elevating-rolls have their butts brought within reach of the packers $F^{51}$, said packers will seize the butts and advance them at a single stroke to and between the husking-rolls, to which the stalks will thus be presented butts first, though not directly endwise, but so that the ends will be seized between the forward ends of the husking-rolls, which will draw in the entire stalks, and in doing so will seize the stems of the ears at their base and force the ears off the stems and out of the husks, passing the husks, with the stems and stalks, on through between the husking-rolls. It is important that the packer should force the stalks close enough to the rolls so that said stalks shall certainly be seized by the rolls; but the action of the packers must be such that when they chance to engage an ear upon the stalk they shall not force it between the rolls. In order that they may have the necessary range of elasticity and feed the stalks certainly, and with equal certainty avoid feeding the ears between the rolls, the springs $F^{51}$ are employed, associated, as described, with the links $F^{52}$, which control the packers, so that when the packer engages an ear of corn and forces it against the husking-rolls the packer may yield, compressing the spring rather than force the ear into the rolls or crush it. As a prevention against the danger of the stalks sliding back the rear bar $G^{20}$ is serrated, the teeth preferably pointing upward toward the top of the elevator and acting as a ratchet, which permits the stalk to slide up over it, but prevents them from moving in the opposite direction. For a similar purpose the toothed plate $g^{10}$ is provided, secured to the bracket $G^4$, about which the packers operate, so that the stalks moved by the forward stroke of the packer will be detained by said teeth and not allowed to fall at the retreating-stroke. The ears detached from the stalks by the rolls fall into a receptacle located in the usual position below the rolls. The front side V of such receptacle is shown in Fig. 3, and broken away to show the trap-door or tilting bottom $V'$, which is lifted by the chain $V^2$. Said chain extends around suitable guides to the vicinity of the driver's seat, and is there attached to the lever $V^3$, by means of which the driver may at will lift and drop the trap-door $V'$ to discharge the contents of the ear-receptacle. The stalks and husks, having passed through the husking-rolls, are discharged upon the inclined deck or chute-board M, which covers the drive-wheel and driving-gear on the stubble side of the wheel, being supported at the stubble side by the brackets $M'$, secured to the bar $C^2$, and at the opposite side, which is over the drive-wheel, being secured to the brackets $M^2$, which are extended from bar $C^{13}$. At the forward part of the machine the deck M is cut away, and instead thereof in the same plane there is located the bar $M^3$, which is secured at the upper or grainward end by the bracket $M^{30}$ to the bar $C^{13}$, and at the lower end by the bracket $M^{31}$ to the bar $C^2$. Underneath this bar $M^3$, and occupying the entire width of the machine from the post $C^3$ stubbleward and extending from the vertical plane of the forward edge of the drive-wheel forward to a point somewhat forward of the vertical plane of the sickle, there is located the box or grain-receptacle N above the gearing at the forward end of the shaft $a^4$, its forward side being aslant over the shaft F', the vertical plane of the forward line of its bottom being forward of the bearing of the gear-wheel F. This grain-receptacle is secured to the bracket $M^{31}$ and to the post $C^8$, and its bottom slopes down stubbleward. To the plank $C^{18}$ are secured the brackets O, in which is journaled the rock-shaft O', to which are secured the curved arms $O^{10}$, which extend stubbleward and downward above deck M, upon which at their lowest position their outer ends rest. This shaft O' and its arms $O^{10}$ constitute a stalk-detaining device to keep the stalks on the deck M until it is desired to drop them. The shaft O' has a lever-arm $O^{11}$, which extends grainward and is in reach from the driver's seat. To the bar $C^{13}$ are pivoted the arms $O^2$, which extend across the space between said bar and the deck M and prevent the stalks falling through said space. When the stalks and husks are ejected from the husking-rolls, they fall upon the desk M, the forward ends, however, resting upon the bar $M^3$. If any ears or grains of corn have been carried with the husks through the husking-rolls, they will be found at the forward part underneath, which is the receptacle N, into which they will fall, while the stalks slide on over the said receptacle, resting on the bar $M^3$. The arms $O^{10}$ of the rock-shaft O' serve as a stalk-retainer, and while they are held in this position, with their outer ends resting on the deck M, the stalks will accumulate in any desired quantity up to their capacity, and such accumulation can be dropped at will by tilting the lever-arm $O^{11}$ over toward the seat-plank and lifting the arms $O^{10}$. When the stalks, having been engaged by the gatherer and bent rearward, are encountered by the sickle and severed from the stubble, the reaction of the stalk as it tends to straighten after being bent by the pressure of the gatherer often tends to throw the butts rearward a considerable distance, and even in some cases so far as to reverse the inclination of the stalks and cause them to fall prostrate with their heads forward. To prevent this result I interpose behind the sickle the check-board Q, which is secured to the front sill C and is from four to six inches high at the grain end and diminishes to about half that height at the stubble end. This diminution of height toward the stubble end is to correspond to the curve of the elevating-chain, which at once seizes the prostrate stalks. I prefer to make such diminution by steps $q$, as illustrated, rather than by a continuous slope, because the latter would cause the butts to slide stubbleward and accumulate at the lowest end and choke the chain.

An important part of this invention relates to the adjustment of the gathering and prostrating mechanism. As hereinbefore stated, the gatherer-frame is pivoted at the forward end to the inside divider considerably forward and a little higher than the sickle, and thence slopes upward and rearward past the vertical plane of the sickle and is adjustable up and down at the rear. If the gatherer-chain has a speed rearward equal to that of the machine forward a tooth of said gatherer will have an absolute motion—that is, a motion with respect to the ground—directly upward, while it moves rearward with respect to the machine. When, therefore, such tooth engages a standing stalk, it will move up along such stalk. If the stalk leans, the teeth of the chain, between which it is engaged, traveling thus upward, tend to bring the stalk to an erect position, whether it is found leaning forward away from the machine or rearward toward the machine. Commonly the gatherer-chain will be given a speed rearward somewhat greater than the traveling speed of the machine, and they will therefore tend to cause the stalks to lean somewhat rearward by the time they are encountered and cut by the sickle; but the sickle will encounter the stalks which lean forward at a shorter interval after they are engaged by the gatherer than in the case of those which lean rearward, and the gatherer will therefore have less time to act upon the former than upon the latter, and hence will not straighten up the former so fully as the latter if it has only the same speed and amount of upward movement in both cases.

In order to adapt the gatherer to stalks differently inclined it is made adjustable, as hereinabove described. When operating upon stocks which lean away from the machine, the driver will set the gatherer at a steeper inclination, thereby increasing the speed and amount of upward movement of the teeth during their travel rearward with respect to the machine, and thus compensating for the disadvantageous position of the stalks. The prostrating mechanism accompanies the gatherer in such adjustment, but being oppositely inclined it is rendered more nearly horizontal by the adjustment, which sets the gatherer more nearly vertical; and this is as desired, since the purpose of the prostrater is to lay the stalks down, and its most effective action for that purpose will be obtained when it operates at right angles to them and so turns them about the point of detention of the butts at the check-board as about a pivot, and when the gatherer is set for rearward leaning stalks such stalks are received by the prostrater leaning somewhat rearward, and the prostrator should therefore tend more downward than when it receives stalks upright or less rearwardly inclined, as is the condition when the gatherer is set for forwardly-leaning stalks. The spring stalk-checks $I^4$ J' accompany the gatherer and prostrater in their adjustments and keep the stalks so checked that they move only as actuated by said devices.

Underneath the elevating mechanism and underneath the rods $G^{10}$ there is located the inclined deck T, which extends up about half the length of the elevator and there terminates. It is channeled or grooved underneath each chain $F^{71}$, the concave channels $t$ being preferably, as illustrated, of considerable width and relatively shallow. The purpose of this deck is to support the weight of the ears and prevent them from sagging the stalks between the bars $G^{10}$, and so preventing the teeth $f^{71}$ from obtaining good hold upon them. When the teeth have once fairly engaged a stalk and are pushing it up the elevator they will easily retain their grasp upon it, and hence the deck T is not made continuous all the way up. When the stalks pass beyond it the ears will droop from the stalks and will thereby be in better position to be picked off the stalk by the husking-rolls when the stalk is reached by the latter.

The elevating mechanism shown in the drawings and described in this specification and its relation to the gathering and prostrating mechanism I do not claim, broadly, the same being the invention of John F. Steward, and claimed in his application filed February 23, 1888, Serial No. 265,343.

In order that the leaves and husks may not cling and become wrapped around the husking-rolls, I provide the metal lip $c^{13}$, secured to the bar $C^{13}$, at the discharge side of the rolls. This lip is made wide enough so that it projects outside the lower roll far enough to be encountered by the ribs of the roll as it revolves. It is made flexible enough, so that it will yield when thus encountered and spring back to place when the rib passes it. It thus strips off the leaves and husks from the rolls and causes them to be properly discharged.

I claim—

1. In a corn-harvester, in combination with the sickle, the gatherer operating in an upwardly-inclined direction from the front to rear from a point forward of the vertical plane of the sickle to a point in the rear of said plane and adjustable up and down at its rear end, substantially as set forth.

2. In a corn-harvester, in combination with the sickle, the gatherer having its receiving end forward of the vertical plane of the sickle and operating rearward, and the prostrator receiving the stalks from the gatherer and operating in a direction inclined downward toward the rear, its rear end being behind the vertical plane of the sickle, substantially as set forth.

3. In a corn-harvester, in combination substantially as set forth, the gatherer and the prostrator, both operating rearward, the former with an upward inclination and delivering the stalks to the latter, said latter having a downward inclination, substantially as set forth.

4. In a corn-harvester, in combination with the sickle, the gatherer, having its receiving end forward of the vertical plane of the sickle and operating rearward with an upward inclination and adjustable up and down at its rear end, and the prostrator, receiving the stalks from the gatherer and operating rearward with a downward inclination, substantially as set forth.

5. In a corn-harvester, in combination with the sickle, the gatherer-chain, operating in an inclined direction upwardly from front to rear, having its delivery end in the rear of the vertical plane of the sickle, and the prostrating-chain, operating in an inclined direction downward from front to rear, having its receiving end overhanging the delivery end of the gatherer-chain, substantially as set forth.

6. In a corn-harvester, in combination with the sickle, the gatherer mechanism and prostrating mechanism, having their respective supporting-frames rigidly united, the former mechanism operating upwardly from front to rear, the latter mechanism being located at the discharge end of the former, the combined frames which sustain said mechanisms being pivoted at the forward end and adjustable up and down at its rear part about such pivot, substantially as set forth.

7. In a corn-harvester, in combination with the main frame and mechanism to tilt it over its supporting-wheels, the gatherer, having its frame pivoted at its forward end to the main frame forward of the vertical plane of the sickle and adjustable up and down at the rear end, substantially as set forth.

8. In a corn-harvester, in combination with the main frame and mechanism to tilt it over its supporting-wheels, the gatherer, having its frame pivoted at its forward end to the main frame forward of the vertical plane of the sickle and adjustable up and down at its rear end, and the gathering mechanism, operating rearward on said gatherer-frame with an upward inclination, substantially as set forth.

9. In a corn-harvester, in combination, the harvester-frame comprising stubbleward and grainward dividers projecting forward of the vertical plane of the sickle, a gatherer comprising a frame pivoted to the stubbleward divider forward of the sickle, and an endless toothed chain traveling about sprocket-wheels journaled to said gatherer-frame, its grainward ply operating in a direction inclined upward from front to rear, such gatherer being adjustable up and down at its rear end, substantially as set forth.

10. In a corn-harvester, in combination with the main frame having two dividers projecting forward of the vertical plane of the sickle and having supported on said projecting dividers, respectively, a stalk-gatherer and a stalk-guide which co-operate, a rock-shaft journaled behind the vertical plane of the cut of the sickle and having crank-arms at each end of the cut, and suitable connections from said crank-arms, respectively, to the stalk-gatherer and stalk-guide, whereby the position of said gatherer and guide may be simultaneously adjusted, substantially as set forth.

11. In a corn-harvester, the main frame comprising stubbleward and grainward dividers projecting forward, the gatherer-frame pivoted upon the stubbleward divider, and a stalk-guide pivoted upon the grainward divider, and a rock-shaft located behind the vertical plane of the cut, having a crank-arm at each end, and suitable links connecting said crank-arms to the gatherer and the stalk-guide, respectively, whereby such gatherer and stalk-guide are simultaneously adjusted, substantially as set forth.

12. In a corn-harvester, in combination with the sickle, the stalk-receptacle in the rear thereof, and the gatherer, operating from a point forward of the sickle rearwardly with an upward inclination to a point above the forward end of the stalk-receptacle and adjustable up and down at its rear end, substantially as set forth.

13. In a corn-harvester, in combination with the sickle, the stalk-receptacle in the rear thereof, the gatherer, operating from a point forward to a point rearward of the vertical plane of the sickle and overhanging the forward end of said stalk-receptacle, and the prostrating mechanism, operating in a direction inclined downward toward the rear overhanging the forward portion of the stalk-receptacle, substantially as set forth.

14. In a corn-harvester, in combination with the sickle, a stalk-receptacle in the rear thereof, the gatherer, having its frame pivoted to the main frame forward of the vertical plane of the sickle and adjustable up and down at its rear end, and its gathering mechanism operating rearward with an upward inclination to a point above the stalk-receptacle, and the prostrator, receiving the stalks from the gatherer and operating rearwardly with a downward inclination above the forward part of the stalk-receptacle, substantially as set forth.

15. In a corn-harvester, in combination with the sickle, a stalk-receptacle in the rear thereof, the gatherer, having its frame pivoted to the main frame forward of the vertical plane of the sickle and adjustable up and down at its rear end, and its gathering mechanism operating rearward with an upward inclination to a point above the stalk-receptacle, and the prostrator, receiving the stalks from the gatherer and operating rearwardly with a downward inclination above the forward part of the stalk-receptacle and adjustable up and down, substantially as set forth.

16. In a corn-harvester, in combination with the elevating mechanism, packers located at the delivery side of such mechanism and at the forward end, and husking-rolls located beyond the packers, whereby such packers receive the stalks from the elevating mechanism and advance the butts thereof to the husking-rolls, substantially as set forth.

17. In a corn-harvester, in combination with the husking-rolls, yielding packers operating at the receiving side, their ordinary range of movement being close to the rolls, whereby the stalks are fed into the husking-rolls, but not positively forced thereinto, substantially as set forth.

18. In a corn-harvester, in combination with the elevating mechanism, the brackets $G^4$, having upwardly concave arms, which form a stalk-receptacle at the delivery side of the elevating mechanism, a packer operating above said receptacle at the forward end, the forward bracket having the serrated plate $g^{10}$, substantially as and for the purpose set forth.

19. In a corn-harvester, in combination with the elevating mechanism, husking-rolls beyond the delivery side thereof, the inclined deck M on the stubble side of the husking-rolls and sloping downward therefrom, and the stalk-detainer, comprising the rock-shaft $O'$ and its arms $O^{10}$ overhanging deck and the means for rocking said shaft to raise and depress said arms, substantially as and for the purpose set forth.

20. In a corn-harvester, in combination with the husking-rolls located above the level of the drive-wheel, the deck beyond said rolls sloping stubbleward and downward, and a grain-receptacle located at the forward end of said deck below the level thereof, substantially as set forth.

21. In a corn-harvester, in combination with the husking-rolls and the deck M, sloping downward and stubbleward from the discharge side thereof, the grain-receptacle N, forward of said deck and below the level thereof, and the bar $M^3$, located in the plane of the said deck and above the said receptacle, substantially as set forth.

22. In a corn-harvester, in combination with the elevating mechanism, the bars $G^{10}$, and the upward-sloping deck T underneath said mechanism, said sloping deck extending from its receiving side part-way only toward the delivery side, whereby the ears of corn are supported long enough to allow the elevating mechanism to obtain secure hold on the stalks, and the ears are then allowed to droop, substantially as and for the purpose set forth.

23. In a corn-harvester, in combination with the elevating mechanism, a blade fixed to the frame at the forward end of the elevating mechanism, and a blade revolving adjacent to said fixed blade and on the rear side thereof, whereby the projecting ends of the stalks are cut off as they are carried upward by the elevating mechanism, substantially as set forth.

24. In a corn-harvester, in combination and substantially as set forth, the gatherer-frame and the prostrating-frame, the former sloping upward from front to rear and the latter sloping downward from front to rear, overhanging the former, the gathering and prostrating chains traveling about sprocket-wheels supported on said frame, respectively, and a drum connecting the forward end of the prostrating-frame to the rear portion of the gatherer-frame, substantially as set forth.

25. In a corn-harvester, in combination with the sickle, the gathering mechanism, and the elevator carrying the stalks sidewise stubbleward from behind the sickle, the check-board Q, located behind the sickle and diminishing in height toward the stubble end, substantially as set forth.

26. In a corn-harvester, in combination with the sickle, the gathering mechanism, and the sidewise operating elevator, the check-board Q, located behind the sickle and diminishing in height by steps toward the stubble end, substantially as and for the purpose set forth.

27. In a corn-husker, in combination with the husking-rolls, the flexible stripping-lip $c^{13}$, located near to one of the rolls at the discharge side thereof, and having its edge in position to scrape the whole length of the roll as it revolves, substantially as set forth.

28. In combination with a longitudinally-ribbed husking-roll, the flexible lip $c^{13}$, located at the discharge side of such roll and near enough thereto to be encountered by the whole length of the ribs thereof, substantially as and for the purpose set forth.

JOHN A. STONE.

Witnesses:
JOHN F. STEWARD,
JOHN B. KASPARI.